(12) United States Patent
Takiguchi et al.

(10) Patent No.: US 8,388,269 B2
(45) Date of Patent: Mar. 5, 2013

(54) PIN MIRROR CUTTER

(75) Inventors: Syoji Takiguchi, Anpachi-gun (JP);
Motoshi Shirai, Anpachi-gun (JP);
Toshiyoshi Watanabe, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/004,450

(22) Filed: Jan. 11, 2011

(65) Prior Publication Data

US 2011/0129308 A1 Jun. 2, 2011

Related U.S. Application Data

(62) Division of application No. 10/595,650, filed as application No. PCT/JP2004/015837 on Oct. 26, 2004, now Pat. No. 7,938,599.

(30) Foreign Application Priority Data

Nov. 4, 2003 (JP) ................................ 2003-374177
Nov. 4, 2003 (JP) ................................ 2003-374180
Aug. 6, 2004 (JP) ................................ 2004-230442

(51) Int. Cl.
*B23C 3/06* (2006.01)
*B23C 5/20* (2006.01)
(52) U.S. Cl. .............................. 407/35; 407/43; 82/106
(58) Field of Classification Search .................... 407/51, 407/56, 33–36, 39, 43, 58, 60, 61, 53, 55; 82/106; *B23C 3/06, 5/16, 5/20*
See application file for complete search history.

(56) References Cited

U.S. PATENT DOCUMENTS

| 5,662,436 | A | * | 9/1997 | Bishop | ............................ 407/35 |
| 5,919,008 | A | | 7/1999 | Shimomura | |
| 2002/0021946 | A1 | | 2/2002 | Emoto et al. | |
| 2007/0147966 | A1 | * | 6/2007 | Emoto et al. | .................... 407/66 |
| 2009/0052997 | A1 | | 2/2009 | Shimizu | |
| 2010/0047031 | A1 | | 2/2010 | Schaupp | |

FOREIGN PATENT DOCUMENTS

| JP | 58-8516 | 1/1983 |
| JP | 6-143018 | 5/1994 |
| JP | 07-299638 | 11/1995 |
| JP | 8-118125 | 5/1996 |
| JP | 8-257819 | 10/1996 |

(Continued)

OTHER PUBLICATIONS

European Search Report mailed Mar. 30, 2010 for the corresponding European Patent Application No. 04792958.3.

(Continued)

*Primary Examiner* — Andrea Wellington
*Assistant Examiner* — Sara Addisu
(74) *Attorney, Agent, or Firm* — Leason Ellis LLP

(57) ABSTRACT

A throw-away tip is mounted on a first tip mounting seat of a pin mirror cutter. In the throw-away tip, cutting edges are formed at intersecting ridgeline parts between a pair of oppositely disposed long side faces of a substantially trapezoidal flat-plate-shaped tip body, and upper and lower faces of the tip body. A thickness direction of the tip body is approximately aligned with a radial direction of the cutter body to provide curved edges formed in acute corner parts of the tip body for cutting. The tip is mounted on a second tip mounting seat of the pin mirror cutter such that the thickness direction of the tip body is approximately aligned with an axial direction of the cutter body to provide curved edges formed in obtuse corner parts of the tip body for cutting.

2 Claims, 10 Drawing Sheets

FOREIGN PATENT DOCUMENTS

| | | |
|---|---|---|
| JP | 9309019 | 12/1997 |
| JP | 10-180525 | 7/1998 |
| JP | 2001-212712 | 8/2001 |
| JP | 2002-46009 | 2/2002 |
| JP | 2002-144127 | 5/2002 |
| JP | 2002-307228 | 10/2002 |
| JP | 2003-25132 | 1/2003 |
| JP | 2007276083 A * | 10/2007 |

OTHER PUBLICATIONS

International Search Report for PCT/JP2004/015837 mailed Dec. 28, 2004.

* cited by examiner

PIN MIRROR CUTTER

CROSS-REFERENCE TO PRIOR RELATED APPLICATIONS

This application is a Divisional of U.S. patent application Ser. No. 10/595,650, filed Feb. 26, 2007, which is a U.S. National Phase Application under 35 U.S.C. §371 of International Patent Application No. PCT/JP2004/015837, filed Dec. 24, 2004, and claims the benefit of Japanese Patent Application Nos. 2003-374177, filed Nov. 4, 2003; 2003-374180, filed Nov. 4, 2003 and 2004-230442 filed on Aug. 6, 2004, all of which are incorporated by reference herein. The International Application was published in Japanese on May 12, 2005 as International Publication No. WO 2005/042197 A1 under PCT Article 21(2).

BACKGROUND OF THE INVENTION

1. Technical Field

The present invention relates to a pin mirror cutter to machine, for example, a crank shaft used for a reciprocal internal combustion engine, and a throw-away tip (hereinafter referred to as a tip) mounted thereon, and particularly, to an attaching mechanism when a pin mirror cutter is attached to an adaptor mounted on a processing machine.

2. Background Art

Conventionally, for example, a so-called internal pin mirror cutter as disclosed in Japanese Unexamined Patent Application Publication No. 2002-46009 is known.

In this pin mirror cutter, a plurality of first tip mounting seats are formed in an inner peripheral face of a substantially annular cutter body which rotates around the axis, a plurality of second tip mounting seats are formed in opposite end faces of a cutter body, and the same type of tip is mounted on each of the first tip mounting seat and second tip mounting seat.

In the tip, a total of eight cutting edges are formed at the intersecting ridgeline parts between a pair of oppositely disposed side faces of a tip body, which is formed in a substantially parallelogrammic flat-plate shape, and upper and lower faces of the tip body. In a pair of side faces other than the above one pair of side faces, the regions of the tip body on the side of their obtuse corner parts are cut off such that their corner angle is reduced, whereby the other pair of side faces is composed of two wall surfaces to form a crest shape which is made convex toward the outside of the tip body. Furthermore, each of parts connected to the other pair of side faces in the upper and lower faces of the tip body is chamfered in the shape of a convex surface.

The tip mounted on the first tip mounting seat has one cutting edge which is formed in an acute corner part of the tip body which is formed in a substantially parallelogrammic flat-plate shape. This one cutting edge is caused to protrude from an inner peripheral face of the cutter body so as to have a positive axial rake (axial rake angle) and a negative radial rake (radial rake angle) and is used as a pin edge which machines an outer peripheral face of a pin part (shaft part) in a crank shaft.

Moreover, the tip mounted on the second tip mounting seat has one cutting edge formed in an obtuse corner part of the tip body which is formed in a substantially parallelogrammic flat-plate shape. This cutting edge is caused to protrude from an end face of a cutter body so as to have a negative axial rake (axial rake angle) and a negative radial rake (radial rake angle), and is used as a wave edge which machines side faces of a counterweight part in a crank shaft.

In such a pin mirror cutter, by mounting the same type of tip on the first and second tip mounting seats, the cutting edges formed in a total of eight places with one chip can be provided for cutting and thereby the tool cost of the pin mirror cutter can be suppressed. Also, by using a tip having a substantially parallelogrammic flat-plate-shaped tip body including the other pair of side faces as mentioned above, with respect to a tip to be mounted on the first tip mounting seat, a rake angle to be given to a cutting edge used as the pin edge is set to be positive and the cutting resistance is reduced.

Another conventional pin mirror cutter includes a substantially annular adaptor mounted on a processing machine, and a substantially annular cutter body which is attached to an inner peripheral part of this adaptor and rotates around the axis. The cutter body is formed with a substantially annular flange part which protrudes from the entire periphery of an outer peripheral face of the cutter body toward the radial outer periphery, and the adaptor is formed with a substantially annular stepped part which is recessed from the entire periphery of an inner peripheral face of the adaptor toward the radial outer periphery and receives the flange part.

In such a pin mirror cutter, if the cutter body is inserted into the inner peripheral part of the adaptor along the axial direction thereof, the flange part of the cutter body and the stepped parts of the adaptor are brought into surface contact into each other such that they overlap each other along the radial direction of the cutter body, and the cutter body is positioned in its axial direction with respect to the adaptor. Also, a plurality of key members are allowed to fit into a plurality of notched parts which are formed so as to be depressed from the outer peripheral face of the cutter body toward the radial inner periphery, and one end face of the cutter body is pressed by a plurality of clampers. Thereby, the cutter body is fixed to the adaptor in the peripheral direction, the axis of the cutter body is approximately aligned with the axis of the adaptor, and the cutter body is attached to the inner peripheral part of the adaptor.

However, in such a conventional pin mirror cutter, with respect to a substantially annular contact surface where the flange part of the cutter body can be brought into surface contact with the stepped part of the adaptor, the radial length of the cutter body is set longer, and one end face of the cutter body is pressed by the plurality of clampers. However, the cutter is too weak against a large load (load in the axial direction of the cutter body) in a thrust direction. That is, as a load in the thrust direction is applied to the cutter with the cutter body attached to the adaptor, the stepped part of the cutter body or the flange part of the adaptor may be bent, and correspondingly, a deviation in the thrust direction (axial direction of the cutter body) with respect to the adaptor may be caused. Therefore, the deflection precision of the plurality of cutting edges provided in the inner peripheral part of the cutter body deteriorates.

Moreover, Japanese Unexamined Patent Application Publication No. 8-118125 discloses a pin mirror cutter in which a cutter body is formed with a plurality of protruding parts which protrude from the outer peripheral face of the cutter body toward the radial outer periphery, an adaptor is formed with a plurality of notched parts are recessed from the inner peripheral face of the adaptor toward the radial outer periphery for allowing the plurality of protruding parts to fit thereinto, and each of the plurality of protruding parts and the plurality of notched parts is formed in a tapered shape such that the distance between a pair of side faces which face a peripheral direction becomes small as it goes to the front side in a cutter insertion direction (the direction when the cutter body is inserted into an inner peripheral part of the adaptor).

In such a pin mirror cutter, when the cutter body is inserted into the inner peripheral part of the adaptor along the axial direction, the plurality of protruding parts of the cutter body are fitted into the plurality of notched parts, respectively, of the adaptor, whereby the cutter body is positioned in the axial direction with respect to the adaptor, the cutter body is fixed to the adaptor in the peripheral direction, and the axis of the cutter body is approximately aligned with the axis of the adaptor. Also, one end face of the cutter body is pressed by a plurality of clampers and thereby the cutter body is attached to the inner peripheral part of the adaptor.

Yet another conventional pin mirror cutter includes a substantially annular adaptor mounted on a processing machine, and a substantially annular cutter body which is attached to an inner peripheral part of this adaptor and rotates around an axis. For example, Japanese Unexamined Patent Application Publication No. 8-118125 discloses a pin mirror cutter in which a cutter body is formed with a plurality of protruding parts which protrude from the outer peripheral face of the cutter body toward the radial outer periphery, an adaptor is formed with a plurality of notched parts which are recessed from the inner peripheral face of the adaptor toward the radial outer periphery for allowing the plurality of protruding parts to fit thereinto, and each of the plurality of protruding parts and the plurality of notched parts is formed in a tapered shape such that the distance between a pair of side faces which face a peripheral direction becomes small as it goes to the front side in a cutter insertion direction (the direction when the cutter body is inserted into an inner peripheral part of the adaptor).

In such a pin mirror cutter, when the cutter body is inserted into the inner peripheral part of the adaptor along the axial direction, the plurality of protruding parts of the cutter body are fitted into the plurality of notched parts, respectively, of the adaptor, whereby the cutter body is positioned in the axial direction with respect to the adaptor, the cutter body is fixed to the adaptor in the peripheral direction, and the axis of the cutter body is approximately aligned with the axis of the adaptor. Also, one end face of the cutter body is pressed by a plurality of clampers and thereby the cutter body is attached to the inner peripheral part of the adaptor.

However, in the pin mirror cutter disclosed in Japanese Unexamined Patent Application Publication No. 2002-46009, the cutting edge as a pin edge whose axial rake is set to be positive is formed in the acute corner part of the tip body which is formed in a substantially parallelogrammic flat-plate shape, and this tip body includes the other pair of side faces which are cut off in the region on the side of the obtuse corner part. Thus, the radial rake of the cutting edge as a wave edge formed in the obtuse corner part of the tip body may become very large inevitably toward the negative angle. Therefore, the pin mirror cutter disclosed in this Japanese Unexamined Patent Application Publication No. 2002-46009 could not be effective solving means for reducing cutting resistance in actuality.

Moreover, since the tip body of such a tip includes the other pair of side faces which are cut off at the obtuse corner part, if the tip body is not lengthened by that cut-off, the cutting edge length could not be sufficiently ensured. Therefore, the occupation space of the tip mounting seat to be formed in the cutter body may become large, and the strength of this cutter body may be lowered. In addition, since the shape of the tip body is complicated, there is also a problem in that the manufacture is difficult and the processing cost may increase.

SUMMARY OF THE INVENTION

The present invention has been made in view of the above problems. It is therefore a first object of the present invention to provide a pin mirror cutter and a tip mounted thereon which can effectively reduce the cutting resistance and keep the strength of a cutter body high, and can be efficiently manufactured.

However, in the pin mirror cutter disclosed in Japanese Unexamined Patent Application Publication No. 8-118125, although it is strong against a load in a thrust direction, positioning of the cutter body to the adaptor in the axial direction is made only by fitting between the fitting of the tapered protruding parts, and the tapered notched parts. Therefore, if the cutter body is replaced with a new one while the adaptor expands thermally by the cutting heat produced at the time of machining, there is a problem that this cutter body will deviate in the axial direction with respect to the adaptor. That is, since the plurality of notched parts formed in this adaptor is widened due to the thermal expansion of the adaptor, if the protruding parts of the cutter body at room temperature are fitted into such widened notched parts, respectively, the cutter body may be inserted too much deeply into the inner peripheral part of the adaptor. As a result, the deflection precision of the plurality of cutting edges provided in the inner peripheral part of the cutter body is worsened.

The present invention has been made in view of the above problems. It is therefore a second object of the present invention to provide a pin mirror cutter which can keep the deflection precision of cutting edges, without causing a cutter body to deviate in an axial direction with respect to an adaptor even due to the load and cutting heat in a thrust direction.

However, in the pin mirror cutter disclosed in Japanese Unexamined Patent Application Publication No. 8-118125, the gap located between a plurality of protruding parts formed in the cutter body are opened toward both the end faces of the cutter body, and the plurality of notched parts formed in the adaptor are opened to both the end faces of the adaptor. Therefore, the rigidity of each of the cutter body and the adaptor cannot be kept high, and accordingly, the mounting rigidity when the cutter body is mounted to the adaptor can also be kept high. As a result, there is a problem in that the deflection precision of the plurality of cutting edges provided in the inner peripheral part of this cutter body may deteriorate due to occurrence of deviation of the cutter body to the adaptor.

The present invention has been made in view of the above problems. It is therefore a second object of the present invention to provide a pin mirror which can keep high the mounting rigidity when a cutter body is attached to an adaptor and can continue to maintain the deflection precision of cutting edges well, without causing any deviation of the cutter body to the adaptor.

In order to solve the above problems and to achieve the first object, a pin mirror cutter according to the present invention includes a first tip mounting seat formed in a peripheral face of a substantially annular cutter body which rotates around an axis, and a second tip mounting seat formed in an end face of the cutter body. A throw-away tip in which cutting edges are formed at the intersecting ridgeline parts between a pair of oppositely disposed side faces of a substantially trapezoidal flat-plate-shaped tip body and upper and lower faces of the tip body is mounted on the first tip mounting seat such that a thickness direction of the tip body is approximately aligned with a radial direction of the cutter body to provide cutting edges formed in acute corner parts of the tip body for cutting. The throw-away tip is mounted on the second tip mounting seat such that the thickness direction of the tip body is approximately aligned with the axial direction of the cutter body to provide cutting edges formed in obtuse corner parts of the tip body for cutting.

Moreover, the tip according to the present invention is a throw-away tip mounted on the pin mirror cutter of the present invention, in which cutting edges are formed at the intersecting ridgeline parts between a pair of oppositely disposed side faces of a substantially trapezoidal flat-plate-shaped tip body and upper and lower faces of the tip body.

In order to solve the above problem and to achieve the second object, a pin mirror cutter according to the present invention includes an adaptor mounted on a processing machine, and a substantially annular cutter body which is attached to the adaptor and rotates around an axis. The cutter body is formed with a substantially annular flange part which protrudes in a radial direction of the cutter body from the entire periphery of a peripheral face of the cutter body, and the adaptor is formed with a substantially annular stepped part which is recessed in the radial direction of the cutter body from the entire periphery of a peripheral face of the adaptor and receives the flange part. With the cutter body attached to the adaptor, the flange part and the stepped part are brought into surface contact with each other such that they overlap each other in the radial direction of the cutter body, and the radial length of the cutter body in this contact surface is set to be in a range of 0.1 D to 1.0 D of the thickness D of the cutter body.

In order to solve the above-mentioned problems and to achieve the third object, a pin mirror cutter according to the present invention includes an adaptor mounted on a processing machine, and a substantially annular cutter body which is attached to this adaptor and rotates around an axis. The cutter body is formed with a substantially annular flange part which protrudes in a radial direction of the cutter body from the entire periphery of a peripheral face of the cutter body, and the adaptor is formed with a substantially annular stepped part which is recessed in the radial direction of the cutter body from the entire periphery of a peripheral face of the cutter body and receives the flange part. One of a wall surface of the flange part which faces the stepped part and a wall surface of the stepped part which faces the flange part is formed with a salient which protrudes in the axial direction of the cutter body, and the other wall surface is formed with a recessed part which is recessed in the axial direction of the cutter body to allow the salient to fit thereinto.

Moreover, in the present invention, preferably, the salient is formed such that the distance between a pair of side faces thereof which faces a peripheral direction becomes small toward its protruding direction, and the recessed part is formed such that the distance between a pair of side faces thereof which faces the peripheral direction becomes small toward its recessed direction.

According to such a present invention, the tip body of the same type of tip mounted on the first and second tip mounting seats is formed in a substantially trapezoidal flat-plate shape as described above. In the tip mounted on the first tip mounting seat, the cutting edges formed in the acute corner parts of the tip body are provided for cutting as pin edges. In the tip mounted on the second tip mounting seat, the cutting edges formed in the obtuse corner part of the tip body are provided for cutting as wave edges. Therefore, with respect to cutting edge as pin edges in a tip to be mounted on the first tip mounting seat, their axial rake can be set to be positive. In addition, the tip body is formed in a substantially trapezoidal flat-plate shape and each of the side faces other than the pair of side faces is composed of one wall surface. As a result, with respect to cutting edges as wave edges in a tip to be mounted on the second tip mounting seat, their radial rake is set to be negative, but it does not become significantly large toward the negative angle. In the present invention, cutting resistance can be reduced effectively, and machining of a crank shaft can be continued stably with high precision.

Furthermore, each of the other pair of side faces in the tip body is composed of a one wall surface, cutting edge length can be ensured sufficiently without increasing the length of the tip body, and the occupation space of the tip mounting seat formed in the cutter body can be made small, and thereby the strength of this cutter body can be kept high.

In addition, since the tip body is a simple shape, the manufacture of the tip body can be facilitated and the processing cost can also be reduced.

Moreover, according to the present invention, with the cutter body attached to the adaptor, the flange part of the cutter body and the stepped part of the adaptor are brought into surface contact with each other such that they overlap each other in the radial direction of the cutter body, and thereby the cutter body is positioned in the direction of the axis with respect to the adaptor. Therefore, even if the cutter body is replaced with a new one while the adaptor expands thermally by cutting heat, this replaced cutter body hardly causes any deviation in the direction of the axis with respect to the adaptor.

With respect to a substantially annular contact surface where the flange part of the cutter body can be brought into surface contact with the stepped part of the adaptor, since the radial length of the cutter body is set to be 1.0 D or less, even if a large load in a thrust direction is applied, neither the flange part nor the stepped part bends easily, and there is no case that the cutter body may deviate in the direction of the axis with respect to the adaptor due to the load in a thrust direction. Moreover, with respect to this substantially annular contact surface, since the radial length d of the cutter body is set to be 0.1 D or more, there is no case that the positioning functioning of the cutter body with respect to the adaptor may be damaged.

Accordingly, the deflection precision of a plurality of cutting edges provided in the inner peripheral part of the cutter body can be kept high, and consequently the machining accuracy of a crank shaft can be improved.

In the present invention to the cutter body, preferably, the cutter body is formed with a plurality of protruding parts which protrude in the radial direction of the cutter body from the peripheral face of the cutter body, and the adaptor is formed with a plurality of notched parts which are recessed in the radial direction of the cutter body from the peripheral face of the adaptor. With the cutter body attached to the adaptor, the plurality of protruding parts are fitted into the plurality of notched parts, respectively, whereby the cutter body is fixed to the adaptor in the peripheral direction, and the axis of the cutter body is approximately aligned with the axis of the adaptor.

Moreover, according to the present invention, with the cutter body attached to the adaptor, with the cutter body attached to the adaptor, the salient formed in the flange part is fitted into the recessed part such that the cutter body is positioned in the direction of the axis with respect to the adaptor and the axis of the cutter body is approximately aligned with the axis of the adaptor.

Since the salient is formed so as to protrude in the direction of the axis from the wall surface in the substantially annular flange part or stepped part, and the recessed part is formed so as to be recessed in the direction of the axis of the cutter body from the wall surface in the substantially annular stepped part or flange part, the gap located between the salients, and the recessed part can be prevented from being opened toward both end faces of the cutter body and toward both end faces of the adaptor. As a result, and the rigidity of each of the cutter body and the adaptor can be kept high.

Accordingly, since the mounting rigidity when the cutter body is mounted to the adaptor can be kept high, the deflection precision of a plurality of cutting edges provided in the inner peripheral part of this cutter body can be kept well without causing any deviation of the cutter body with respect to the adaptor, and consequently the machining accuracy of a crank shaft can be improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
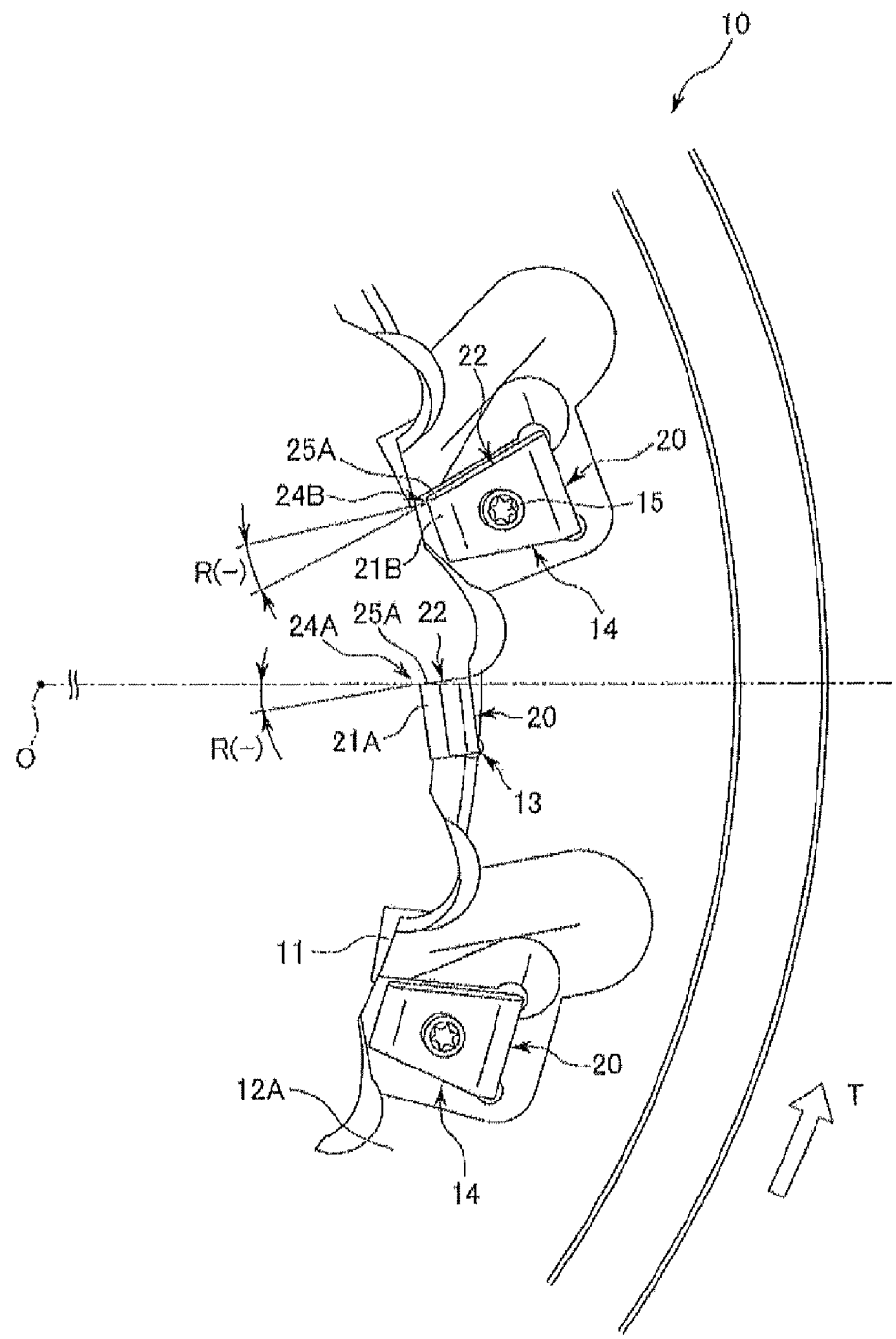
FIG. 1 is an enlarged explanatory view of principal parts of an end face in a cutter body of a pin mirror cutter according to an embodiment of the present invention.

The embodiments will now be described with reference to the accompanying drawings, wherein like reference numerals designate corresponding or identical elements throughout the various drawings.

Figure 2:
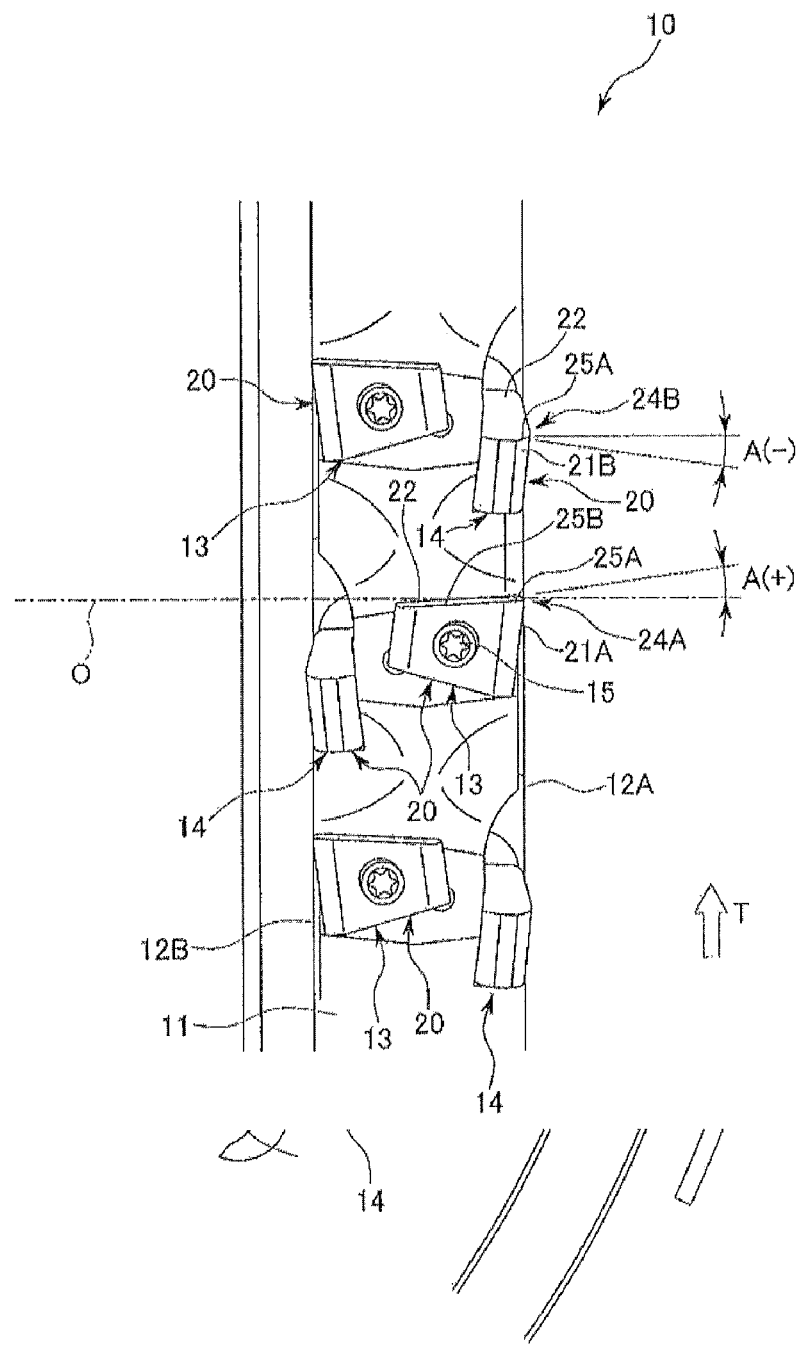
FIG. 2 is an enlarged explanatory view of principal parts of an inner peripheral face in the cutter body of the pin mirror cutter according to the embodiment of the present invention.

FIGS. 1, 2 and 3 show a pin mirror cutter according to an embodiment of the present invention.

A cutter body 10 of the pin mirror cutter according to the embodiment of the present invention is a substantially annular cutter body about the axis O rotated around the axis O, as shown in enlarged views of principal parts of FIGS. 1 and 2.

In this cutter body 10, an inner peripheral face 11 facing the radial inner peripheral side is formed with a plurality of first tip mounting seats 13 which are formed approximately at equal intervals along a peripheral direction of the cutter body 10, and the inner peripheral face 11 of each of opposite end faces 12A and 12B facing the outside in the direction of the axis O is formed with a plurality of second tip mounting seats 14 which are formed approximately at equal intervals along the peripheral direction of the cutter body 10.

The plurality of first tip mounting seats 13 formed in the inner peripheral face 11 of the cutter body 10 are configured in the peripheral direction such that the first tip mounting seats disposed in the vicinity of one end face 12A of the opposite end faces 12A and 12B of the cutter body 10, and the first tip mounting seats disposed in the vicinity of the other end surface 12B are alternately arranged in the peripheral direction of the cutter body 10.

The plurality of second tip mounting seats 14 formed in one end face 12A of the cutter body 10 are arranged in the peripheral direction such that each second tip mounting seat is disposed slightly behind each of the plurality of first tip mounting seats 13, which are formed in the inner peripheral face 11 in the vicinity of the other end surface 12B, in a cutter rotation direction T. The plurality of second tip mounting seats 14 formed in the other end surface 12B of the cutter body 10 are also arranged in the peripheral direction such that each second tip mounting seat is disposed slightly behind each of the plurality of first tip mounting seats 13, which are formed in the inner peripheral face 11 in the vicinity of one end face 12A, in the cutter rotation direction T.

Figure 3A:
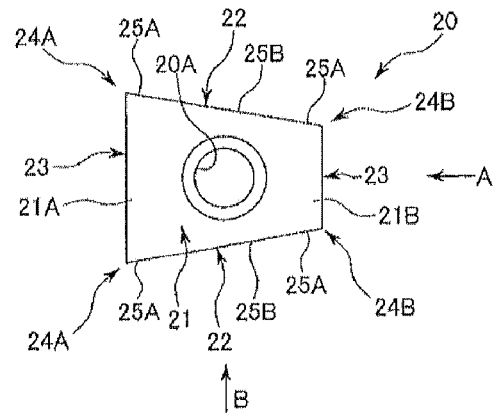
FIG. 3A is a top view showing a tip body of a tip mounted on the pin mirror cutter according to the embodiment of the present invention.

A tip body 20 of a tip mounted on each of the above-mentioned first tip mounting seats 13 and second tip mounting seats 14, as shown in FIG. 3, has a substantially trapezoidal flat-plate shape. This tip body includes upper and lower faces 21 and 21 which are parallel to each other and disposed opposite to each other at both ends of the tip body 20 in its thickness direction, a pair of long side faces 22 and 22 (one pair of side faces) which are disposed opposite to each other at both ends of the tip body 20 in its width direction, and a pair of short side faces 23 and 23 (the other pair of side faces) which are parallel to each other and are disposed opposite to each other at both ends of the tip body 20 in its longitudinal direction. Therefore, the tip body 20, as shown in a top view of FIG. 3A (as seen along the thickness direction of the tip body 20), has a pair of acute corner parts 24A and 24A which have a corner angle approximately equal to each other, and similarly, a pair of obtuse corner parts 24B and 24B which have a corner angle equal to each other.

Figure 3B:
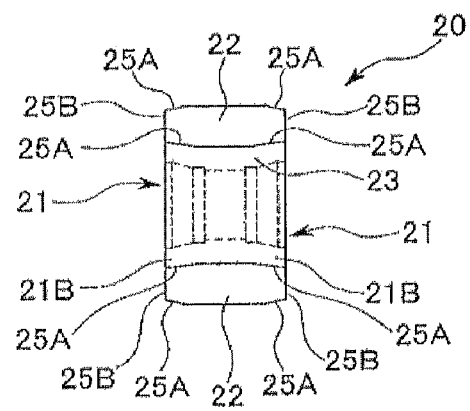
FIG. 3B is a side view of the tip as seen in the direction A of FIG. 3A.

Here, an insertion hole 20A for allowing a clamping screw to be used when a tip is fixed with the screw to be inserted therethrough is formed almost in a central part of the tip body 20 such it passes through the upper and lower faces 21 substantially of the tip body 20 in its thickness direction (right-and-left direction in FIG. 3B or direction orthogonal to the upper and lower faces 21).

Each of the pair of long side faces 22 and 22 of the tip body 20 includes one substantially flat face which is made substantially parallel to the thickness direction of the tip body 20, and each of the pair of short side faces 23 and 23 of the tip body 20 includes one substantially flat face which is made substantially parallel to the thickness direction of the tip body 20.

Figure 3C:
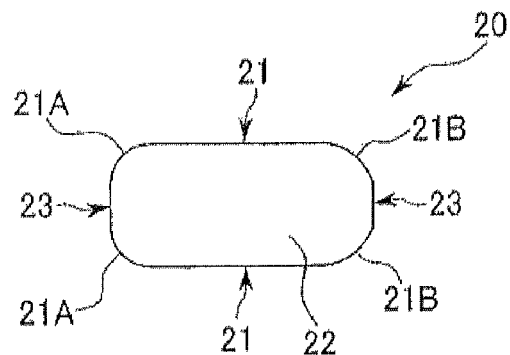
FIG. 3C is a side view of the tip as seen in the direction of the arrow B of FIG. 3A.

The upper and lower faces 21 and 21 of the tip body 20 are caused to intersect to the pair of short side faces 23 and 23 of the tip body 20, respectively, in the portions of the tip body 20 at its both ends in its longitudinal direction (right-and-left direction in FIG. 3A). In this case, as shown in FIG. 3C, the portions of each of the upper and lower faces 21 and 21 at its both ends in the above longitudinal direction are machined in the shape of a convex surface. The connected parts of the upper or lower face 21 to be connected to the short side face 23 which connect the pair of acute corner parts 24A and 24A with each other, as shown in the left region of FIG. 3C, are formed as curved surface parts 21A which are smoothly connected to the short side face 23. The connected parts of the upper or lower face to be connected to the other short side face 23 which connects the pair of obtuse corner parts 24B and 24B with each other, as shown in the right region of FIG. 3C, are formed as the curved surface parts 21B which are not smoothly connected to the short side face 23.

Cutting edges are formed in the tip body 20 at the intersecting ridgeline parts between the pair of long side faces 22 and 22, and the upper and lower faces 21 and 21.

More specifically, a total of eight curved edges 25A which are formed substantially in a convex curved shape are formed at intersecting ridgeline parts between the curved surface parts 21A, 21A, 21B, and 21B in each of the upper and lower faces 21 and 21, and the pair of long side faces 22 and 22, and a total of four straight edges 25B which are formed substantially in a straight shape are formed at the intersecting ridgeline parts between parts excluding the curved surface parts 21A, 21A, 21B, and 21B in each of the upper and lower faces 21 and 21 and the pair of long side faces 22 and 22. In brief, one tip is formed with a total of eight curved edges 25A and a total of four straight edges 25B.

The tip constructed as the above construction is fixed to and mounted on the first tip mounting seat 13 with the clamping screw 15 inserted through the insertion hole 20A of the tip body 20 such that one of the pair of long side faces 22 and 22 becomes is a rake face toward the front side in the cutter rotation direction T by aligning the thickness direction of the tip body 20 approximately with the radial direction of the cutter body 10.

In a tip to be mounted on the first tip mounting seat 13, one curved edge 25A (particularly, one curved edge 25A of a total of four curved edges 25A formed at the intersecting ridgeline parts between the curved surface part 21A and the long side face 22 which constitute the portions where the upper and lower faces 21 and 21 and the short side faces 23 and 23 intersect each other) of the eight curved edges 25A formed in the tip, which are formed in the acute corner parts 24A, is caused to protrude from the inner peripheral face of the cutter body 10 toward the above radial inner peripheral side, and the one curved edge is caused to protrude from the end face 12A (12B) of the cutter body 10 toward the outside in the direction of the axis O, and thereby the straight edge 25B connected to this curved edge 25A is caused to protrude from the inner peripheral face 11 of the cutter body 10 toward the above radial inner peripheral side.

The curved edge 25A and the straight edge 25B which are disposed so as to protrude in this manner are used as pin edges which machine the outer peripheral face of a pin part (shaft part) in a crank shaft.

Moreover, the curved surface part 21A which is connected to the rear side, in the cutter rotation direction T, of the curved edge 25A used as a pin edge is inclined toward the above radial outer peripheral side as it goes to the rear side in the cutter rotation direction T, and is inclined toward the inside in the direction of the axis O as it goes to the rear side in the cutter rotation direction T, so that relief is given to this curved surface part 21A that forms a relief face of the curved edge 25A used as a pin edge.

Therefore, the radial rake R (radial rake angle) of the curved edge 25A used as a pin edge is set to be negative (for example, −8°) by inclining this curved edge 25A toward the front side in the cutter rotation direction T as it goes to the above radial outer peripheral side.

On the other hand, the axial rake A (axial rake angle) of the curved edge 25A used as a pin edge is set to be positive (for example, 6°) by inclining this curved edge 25A toward the rear side in the cutter rotation direction T as it goes to the inside in the direction of the axis O.

That is, since the acute corner parts 24A to which the long side face 22 and the short side face 23 which forms a rake face intersect each other at an acute angle exists, even if relief is given to the curved surface part 21A which forms a relief face of the curved edge 25A used as a pin edge, the axial rake of the curved edge 25A used as pin edges can be set to be positive.

Moreover, the tip constructed as above is fixed to and mounted on the second tip mounting seat 14 with the clamping screw 15 inserted through the insertion hole 20A of the tip body 20 such that one of the pair of long side faces 22 and 22 is used as a rake face toward the front side in the cutter rotation direction T by aligning the thickness direction of the tip body 20 approximately with the direction of the axis O of the cutter body 10.

In a tip to be mounted on the second tip mounting seat 14, one curved edge 25A (particularly, one curved edge 25A of a total of four curved edges 25A formed at the intersecting ridgeline parts between the curved surface part 21B and the long side face 22 which constitute the portions where the upper and lower faces 21 and 21 and the short side faces 23 and 23 intersect each other) of the eight curved edges 25A formed in the tip, which are formed in the acute corner parts 24A, is caused to protrude from the inner peripheral face of the cutter body 10 toward the above radial inner peripheral side, and the one curved edge is caused to protrude from the end face 12A (12B) of the cutter body 10 toward the outside in the direction of the axis O.

The curved edge 25A which is disposed so as to protrude in this manner is used as a wave edge which machines side faces of a counterweight part in a crank shaft.

Moreover, the curved surface part 21B which is connected to the rear side, in the cutter rotation direction T, of the curved edge 25A used as a wave edge is inclined toward the inside in the direction of the axis O as it goes to the rear side in the cutter rotation direction T, and is inclined toward the above radial outer peripheral side as it goes to the rear side in the cutter rotation direction T, so that relief is given to this curved surface part 21B that forms a relief face of the curved edge 25A used as a wave edge.

Therefore, the axial rake A (axial rake angle) of the curved edge 25A used as a wave edge is set to be negative (for example, −6°) by inclining this curved edge 25A toward the front side in the cutter rotation direction T as it goes to the inside in the direction of the axis O. Moreover, the radial rake R (radial rake angle) of the curved edge 25A used as a wave edge is set to be negative (for example, −17°) by inclining this curved edge 25A toward the front side in the cutter rotation direction T as it goes to the above radial outer peripheral side.

As the pin mirror cutter constructed as above rotates around the axis O of the cutter body 10 and revolves around the axis of a crank shaft while it moves along the direction of the axis (the axis O of the cutter body 10) of the crank shaft, with the crank shaft attached to a cutter attachment part of a processing machine such that the axis O of the cutter body 10 is aligned with a main shaft, and the crank shaft bridged over a chuck being allowed to pass through an inner space of the cutter body 10, the crank shaft is machined into a certain shape by the pin mirror cutter.

As described above, in the pin mirror cutter according to the embodiment of the present invention, first, since the same type of tips are used as the tips to be mounted on the first tip mounting seats 13 and the second tip mounting seats 14 which are formed in the cutter body 10, the curved edges 25A formed in a total of eight places with one tip can be provided for cutting as pin edges or wave edges, respectively, and the tool cost of the pin mirror cutter can be suppressed.

Since the tip body 20 of such a tip is formed in a substantially trapezoidal flat-plate shape including the pair of long side faces 22 and 22 and the pair of short side faces 23 and 23 as described above, with respect to a tip to be mounted on the first tip mounting seat 13, the axial rake A of the curved edge 25A used as a pin edge can be set to be positive. In addition, each of the short side faces 23 and 23 of the tip body 20 is composed of one substantially flat face, whereby, with respect to the curved edge 25A as a wave edge in a tip to be mounted on the second tip mounting seat 14, the radial rake R is set to be negative, but it does not become significantly large toward the negative angle.

Accordingly, according to the embodiment of the present invention, cutting resistance can be reduced effectively by setting the axial rake A of the curved edge 25A used as a pin edge to be positive, and in this connection machining of a crank shaft can be continued stably with high precision.

Furthermore, in the embodiment of the present invention, since each of the short side faces 23 and 23 in the tip body 20 is composed of a one substantially flat face, cutting edge length can be ensured sufficiently without increasing the length of the tip body 20, and the occupation space of the tip mounting seat 13 formed in the cutter body 10 can be made small, and thereby the strength of this cutter body 10 can be kept high.

In addition, since the tip body 20 is a simple shape which is just formed in a substantially trapezoidal flat-plate shape, the manufacture of the tip body can be facilitated and the processing cost can also be reduced.

In addition, although the embodiment of the present invention described above has been described in conjunction with a case in which the present invention is applied to a so-called internal pin mirror cutter, the present invention is not limited thereto. For example, the present invention may be applied to a so-called external pin mirror cutter in which an outer peripheral face of a cutter body facing its radial outer peripheral side is formed with a plurality of first tip mounting seats, and an outer peripheral face of each of opposite end faces of the cutter body facing its axial direction is formed with a plurality of second tip mounting seats, and these first tip mounting seats and second tip mounting seats are mounted with tips, respectively.

Figure 4:
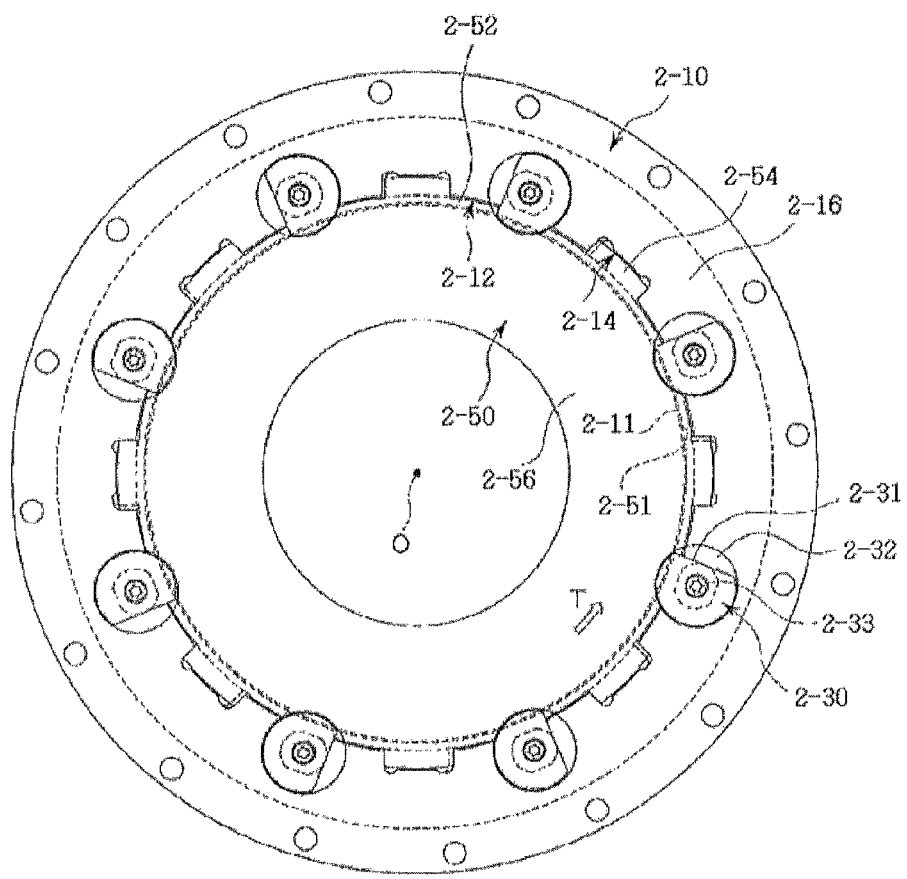
FIG. 4 is a plan view of a pin mirror cutter according to another embodiment of the present invention.
Figure 5:
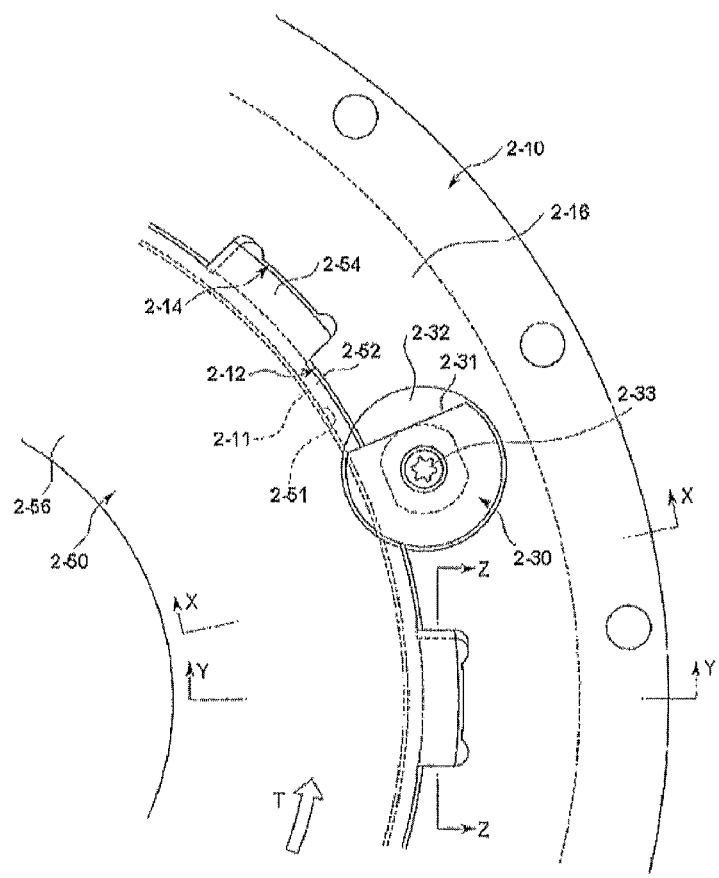
FIG. 5 is an enlarged view of principal parts of the pin mirror cutter shown in FIG. 4.

FIGS. 4 and 5 show a pin mirror cutter according to another embodiment of the present invention, which includes a substantially annular adaptor 2-10 mounted on a processing machine, and a substantially annular cutter body 2-50 about the axis O rotated around the axis O by being inserted into an inner peripheral part of this adaptor 2-10 and attached to the inner peripheral part of the adaptor 2-10.

In addition, although a plurality of throw-away tips which have cutting edges as pin edges for machining an outer peripheral face of a pin part (shaft part) in a crank shaft and cutting edges as wave edges for machining side faces of a counterweight part in the crank shaft are attached to the inner peripheral part of the cutter body 2-50, they are omitted in the drawing.

Figure 6:
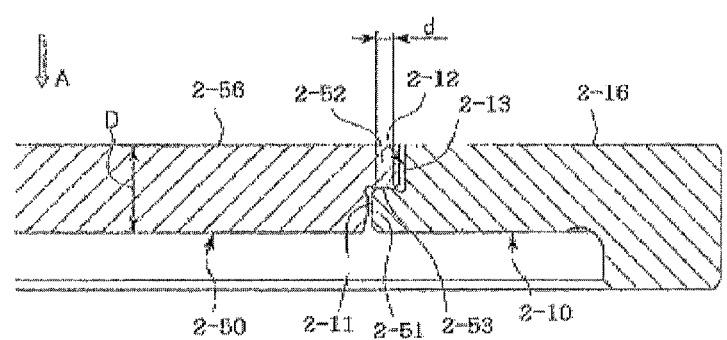
FIG. 6 is a sectional view taken along an X-X line of FIG. 5.
Figure 7:
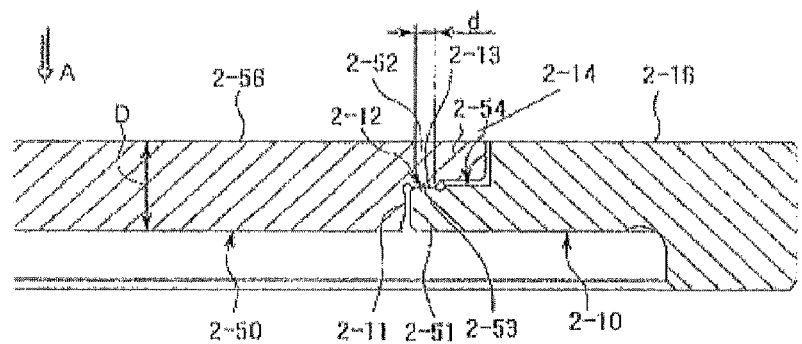
FIG. 7 is a sectional view taken along a Y-Y line of FIG. 5.

As shown in FIGS. 6 and 7, an entire peripheral part of the outer peripheral face 2-51 of the cutter body 2-5 in the rear region (the rear side in a direction when the cutter body 2-50 is inserted into the inner peripheral part of the adaptor 2-10 or the upper side in FIGS. 6 and 7) in a the cutter insertion direction A is caused to protrude toward the radial outer periphery (right side in FIGS. 6 and 7) of the cutter body 2-50.

Therefore, a substantially annular flange part 2-52 which protrudes toward the radial outer periphery is formed in the cutter body 2-50 from the entire periphery of the outer peripheral face 2-51 thereof, and a substantially annular constraint face 2-53 which faces the front side in the cutter insertion direction A is formed in this flange part 2-52.

Furthermore, as shown in FIG. 7, a plurality of places of the outer peripheral face 2-51 of the cutter body 2-50 in the rear region in the cutter insertion direction A are caused to protrude nearer to the radial outer peripheral side of the cutter body 2-50 than the flange part 2-52.

As a result, a plurality of (for example, four or more) protruding parts 2-54 which are formed in a substantially rectangular parallelepiped shape and which protrude partially from the outer peripheral face of the cutter body are formed in the cutter body 2-50 such that they are disposed substantially at equal intervals in the peripheral direction of the cutter body 2-50. Each of the plurality of protruding parts 2-54, as shown in FIG. 8, is formed with a pair of wall surfaces 2-55 and 2-55 which face the front side and rear side (peripheral direction) in the cutter rotation direction T.

Figure 8:
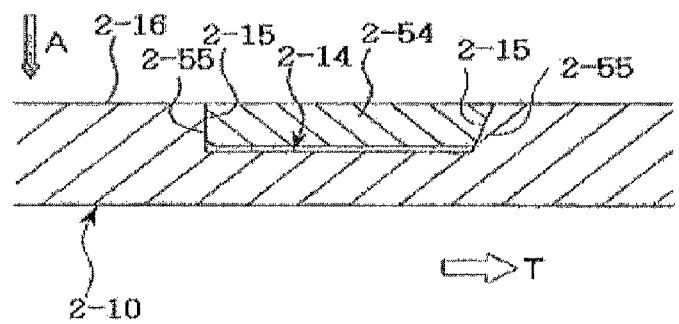
FIG. 8 is a sectional view taken along a Z-Z line of FIG. 5.

Here, as shown in FIG. 8, the wall surface 2-55 of the pair of wall surfaces 2-55 and 2-55 in one protruding part 2-54, which is located on the rear side in the cutter rotation direction T and faces the rear side in the cutter rotation direction T, is caused to extend along the cutter insertion direction A (the direction of the axis O of the cutter body 2-50 or the thickness direction of the cutter body 2-50), while the wall surface 2-55 which is located on the front side in the cutter rotation direction T and faces the front side in the cutter rotation direction T is inclined toward the rear side in the cutter rotation direction T as it goes to the front side (the lower side in FIG. 8) in the cutter insertion direction A.

On the other hand, as shown in FIGS. 6 and 7, the entire peripheral part of the inner peripheral face 2-11 of the adaptor 2-10 in the rear region in the cutter insertion direction A is recessed toward the radial outer periphery of the cutter body 2-50.

Therefore, the adaptor 2-10 is formed with a substantially annular stepped part 2-12 for receiving the flange part 2-52, which is recessed from the entire periphery of the inner peripheral face 2-11 toward the radial outer periphery, and is opened to the one end face 2-16 which faces the rear side in the cutter insertion direction A in an adaptor 2-10. This stepped part 2-12 is formed with a substantially annular constraint face 2-13 which faces the rear side in the cutter insertion direction A.

Furthermore, as shown in FIG. 7, a plurality of places of the inner peripheral face 2-11 of the adaptor 2-10 in the rear region in the cutter insertion direction A are recessed nearer to the radial outer peripheral side of the cutter body 2-50 than the stepped part 2-12.

As a result, a plurality of (for example, four or more) notched parts 2-14 of a substantially rectangular parallelepiped shape which are partially recessed from the inner peripheral face to the adaptor and which allow the plurality of protruding parts 2-54 to fit thereinto are formed in the adaptor 2-10 such that they are disposed substantially at equal intervals in the peripheral direction of the adaptor 2-10. Each of the plurality of notched parts 2-14, as shown in FIG. 8, is formed with a pair of wall surfaces 2-15 and 2-15 which face the front side and rear side (peripheral direction) in the cutter rotation direction T.

Here, as shown in FIG. 8, the wall surface 2-15 the pair of wall surfaces 2-15 and 2-15 in one notched part 2-14, which is located on the rear side in the cutter rotation direction T and faces the front side in the cutter rotation direction T, is caused to extend along the cutter insertion direction A (the thickness direction of the cutter body 2-50 or the direction of the axis O of the cutter body 2-50), while the wall surface 2-15 which is located on the front side in the cutter rotation direction T and faces the rear side in the cutter rotation direction T is inclined toward the rear side in the cutter rotation direction T as it goes to the front side (the lower side in FIG. 8) in the cutter insertion direction A.

If the cutter body 2-50 is inserted toward the front side in the cutter insertion direction A into the inner peripheral part of the adaptor 2-10 along the direction of the axis O, the flange part 2-52 of the cutter body 2-50 is caught by the stepped part 2-12 of the adaptor 2-10 and the plurality of protruding parts 2-54 of the cutter body 2-50 are fitted into the plurality of notched parts 2-14, respectively, of the adaptor 2-10.

When the flange part 2-52 of the cutter body 2-50 is caught by the stepped part 2-12 of the adaptor 2-10, the constraint face 2-53 in the flange part 2-52 and the constraint face 2-13 in the stepped part 2-12 are brought into surface contact with each other such that they are overlap each other along the radial direction of the cutter body 2-50, thereby forming a substantially annular contact surface extending along the radial direction of the cutter body 2-50.

In this way, when the constraint face 2-53 of the flange part 2-52 is brought into surface contact with the constraint face 2-13 of the stepped part 2-12, the cutter body 2-50 is positioned in the direction of the axis O with respect to the adaptor 2-10.

Here, in this embodiment of the present invention, as shown in FIGS. 6 and 7, with respect to a substantially annular contact surface where the constraint face 2-53 of the flange part 2-52 can be brought into surface contact with the constraint face 2-13 of the stepped part 2-12, the width of length d along the radial direction of the cutter body 2-50, i.e., the width of a contact surface, is set to be in a range of 0.1 D to 1.0 D of the thickness D (length along the direction of the axis O in the cutter body 2-50) of the cutter body 2-50.

When the plurality of protruding parts 2-54 of the cutter body 2-50 are fitted into a plurality of notched parts 2-14, respectively, of the adaptor 2-10, a pair of wall surfaces 2-55 and 2-55 in each of the protruding parts 2-54, are brought into surface contact with a pair of wall surfaces 2-15 and 2-15, respectively, in each of the notched parts 2-14.

In this way, when a pair of wall surfaces 2-55 and 2-55 of each protruding part 2-54 are brought into surface contact with a pair of wall surfaces 2-15 and 2-15, respectively, of each notched part 2-14, the cutter body 2-50 is fixed to the adaptor 2-10 in the peripheral direction, and the axis O of the cutter body 2-50 is approximately aligned with the axis of the adaptor 2-10.

As described above, in the state where the cutter body 2-50 is inserted into the inner peripheral part of the adaptor 2-10 and the cutter body 2-50 is positioned in the direction of the axis O with respect to the adaptor 2-10, and the cutter body 2-50 is fixed to the adaptor 2-10 in the peripheral direction, and the axis O of the cutter body 2-50 is approximately aligned with the axis of the adaptor 2-10, the end face 2-56 facing the rear side in the cutter insertion direction A in the cutter body 2-50 is pressed by a plurality of clampers 2-30 (for example, four or more), and thereby the cutter body 2-50 is firmly attached to the inner peripheral part of the adaptor 2-10.

Each clamper 2-30 is formed substantially in the shape of a disc having a notched part 2-31 a portion of the outer peripheral part of which is cut away in a straight shape, and this clamper is fixed with a bolt 2-33 within a substantially circular spot-facing part 2-32 formed in the end face 2-16 of the adaptor 2-10 such that the portion also approaches the end face 2-56 of the cutter body 2-50, with the cutter body 2-50 inserted into the inner peripheral part of the adaptor 2-10.

With the cutter body 2-50 inserted in the inner peripheral part of the adaptor 2-10, this clamper 2-30 is disposed between the plurality of protruding parts 2-54 (the plurality of notched parts 2-14 adjacent to each other in the peripheral direction) adjacent to each other in the peripheral direction) and a plurality of the clampers are disposed at equal intervals in the peripheral direction.

The clamper 2-30 becomes freely rotatable about the bolt 2-33 within the spot-facing part 2-32 by loosening the bolt 2-33. Then, by rotating the clamper 2-30 so that the notched part 2-31 may be located on the radial inner peripheral side of the cutter body 2-50, the cutter body 2-50 can be inserted into the inner peripheral part of the adaptor 2-10, or the cutter body 2-50 can be removed from the inner peripheral part of the adaptor 2-10. On the contrary, by tightening the bolt 2-33 after the clamper 2-30 has been rotated so that the notched part 2-31 may not be located on the radial inner peripheral side of the cutter body 2-50, the cutter body 2-50 inserted into the inner peripheral part of the adaptor 2-10 can be firmly attached to the inner peripheral part of this adaptor 2-10.

Moreover, in a state where one end face 2-56 (correctly, the bottom face of the spot-facing part 2-32) of the cutter body 2-50 is pressed by the clampers 2-30, and thereby the cutter body 2-50 is firmly attached to the inner peripheral part of an adaptor 2-10, the portion of each clamper 2-30 located on the radial innermost peripheral side of the cutter body 2-50 is disposed nearer to the radial inner peripheral side of the cutter body 2-50 than the flange part 2-52 formed to protrude from the outer peripheral face 2-51 of the cutter body 2-50.

As the pin mirror cutter constructed as above rotates around the axis O of the cutter body 2-50 and revolves around the axis of a crank shaft while it moves along the direction of the axis (the axis O of the cutter body 2-50) of the crank shaft, with the crank shaft bridged over a chuck being allowed to pass through an inner space of the cutter body 2-50, the crank shaft is machined into a certain shape by the pin mirror cutter.

According to the pin mirror cutter of the embodiment of the present invention as described above, with the cutter body 2-50 attached to the adaptor 2-10, the flange part 2-52 of the cutter body 2-50 and the stepped part 2-12 of the adaptor 2-10 are brought into surface contact with each other such that they overlap each other in the radial direction of the cutter body 2-50, and thereby the cutter body 2-50 is positioned in the direction of the axis O with respect to the adaptor 2-10. Therefore, even if the cutter body 2-50 is replaced with a new one while the adaptor 2-10 expands thermally by cutting heat, this newly replaced cutter body 2-50 hardly causes any deviation in the direction of the axis O with respect to the adaptor 2-10.

With respect to a substantially annular contact surface where the flange part 2-52 of the cutter body 2-50 can be brought into surface contact with the stepped part 2-12 of the adaptor 2-10, since the radial length d of the cutter body 2-50 is set to be 1.0 D or less, even if a large load in a thrust direction is applied, neither the flange part 2-52 nor the stepped part 2-12 bends easily, and a phenomenon that the cutter body 2-50 may deviate in the direction of the axis O with respect to the adaptor 2-10 due to the load in a thrust direction can also be suppressed. Moreover, with respect to this substantially annular contact surface, since the radial length d of the cutter body 2-50 is set to be 0.1 D or more, there is no case that the positive positioning of the cutter body 2-50 with respect to the adaptor 2-10 may become impossible.

In addition, it is more preferable that the radial length d of the cutter body 2-50 with respect to the substantially annular contact surface be set to a range of 0.2 D to 0.4 D.

Accordingly, in this embodiment of the present invention, the cutter body 2-50 can be prevented from deviating in the direction of the axis O with respect to the adaptor 2-10 even due to factors, such as cutting heat and a load in a thrust direction. As a result, the deflection precision of a plurality of cutting edges provided in the inner peripheral part of the cutter body 2-50 can be kept high, and consequently the machining accuracy of a crank shaft can be improved.

Moreover, in this embodiment of the present invention, since the plurality of protruding parts 2-54 formed in the cutter body 2-50 are fitted into the plurality of notched parts 2-14, respectively, formed in the adaptor 2-10 so that the adaptor 2-10 may be fixed to the cutter body 2-50 in the peripheral direction, and the axis O of the cutter body 2-50 may be approximately aligned with the axis of the adaptor 2-10, fixation and alignment in the peripheral direction of such an adaptor 2-10 can be performed with simple a construction.

Figure 9:
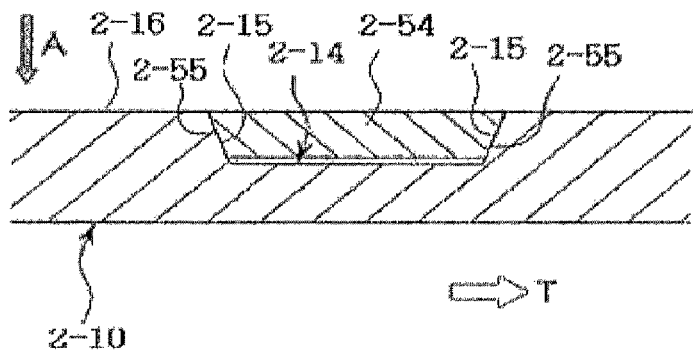
FIG. 9 is a sectional view showing a first modification of protruding parts and notched parts according to the present invention.
Figure 10:
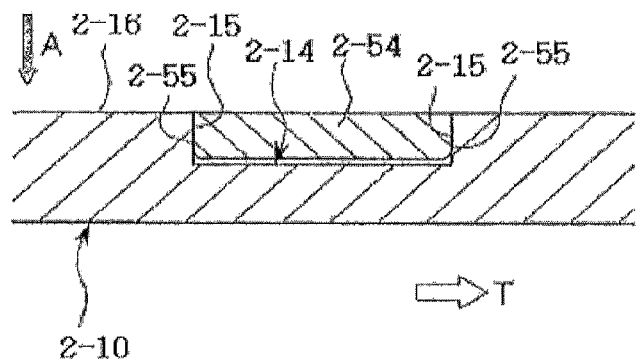
FIG. 10 is a sectional view showing a second modification of protruding parts and notched parts according to the present invention.

Here, the shape of the protruding part 2-54 and the notched part 2-14 into which the protruding part 2-54 fits are not limited to that as shown in FIG. 8 and it may be, for example, those shown in FIGS. 9 and 10.

In the first modification shown in FIG. 9, a wall surface 2-55 of a pair of wall surfaces 2-55 and 2-55 in one protruding part 2-54, which is located on the rear side in the cutter rotation direction T and faces the rear side in the cutter rotation direction T, is inclined toward the front side in the cutter rotation direction T as it goes to the front side in the cutter insertion direction A, while the wall surface 2-55 which is located on the front side in the cutter rotation direction T and faces the front side in the cutter rotation direction T is inclined toward the rear side in the cutter rotation direction T as it goes to the front side in the cutter insertion direction A. Correspondingly, a wall surface 2-15 of a pair of wall surfaces 2-15 and 2-15 in one notched part 2-14, which is located on the rear side in the cutter rotation direction T and faces the front side in the cutter rotation direction T, is inclined toward the front side in the cutter rotation direction T as it goes to the front side in the cutter insertion direction A, while the wall surface 2-15 which is located on the front side in the cutter rotation direction T and faces the rear side in the cutter rotation direction T is inclined toward the rear side in the cutter rotation direction T as it goes to the front side in the cutter insertion direction A.

Moreover, in the second modification shown in FIG. 10, the pair of both wall surfaces 2-55 and 2-55 in one protruding part 2-54 is caused to extend along the cutter insertion direction A, and correspondingly, the pair of both wall surfaces 2-15 and 2-15 in one notched part 2-14 is also caused to extend along the cutter insertion direction A.

In addition, although the embodiment of the present invention described above has been described in conjunction with a case in which the present invention is applied to a so-called internal pin mirror cutter in which a cutter body is attached to the inner peripheral part of an adaptor, the present invention is not limited thereto. For example, the present invention may be applied to a so-called external pin mirror cutter in which a cutter body is attached to the outer peripheral part of an adaptor.

In this case, the cutter body 2-50 is formed with a substantially annular flange part which protrudes from the entire periphery of that inner peripheral face of the cutter body toward the radial inner periphery and similarly, a plurality of protruding parts which protrude from the inner peripheral face toward the radial inner periphery, while the adaptor 2-10 is formed with a substantially annular stepped part which is recessed from the entire periphery of the outer peripheral face toward the radial inner periphery and which receives the flange part, and similarly, a plurality of notched parts which are recessed from the outer peripheral face toward the radial inner periphery.

Figure 11:
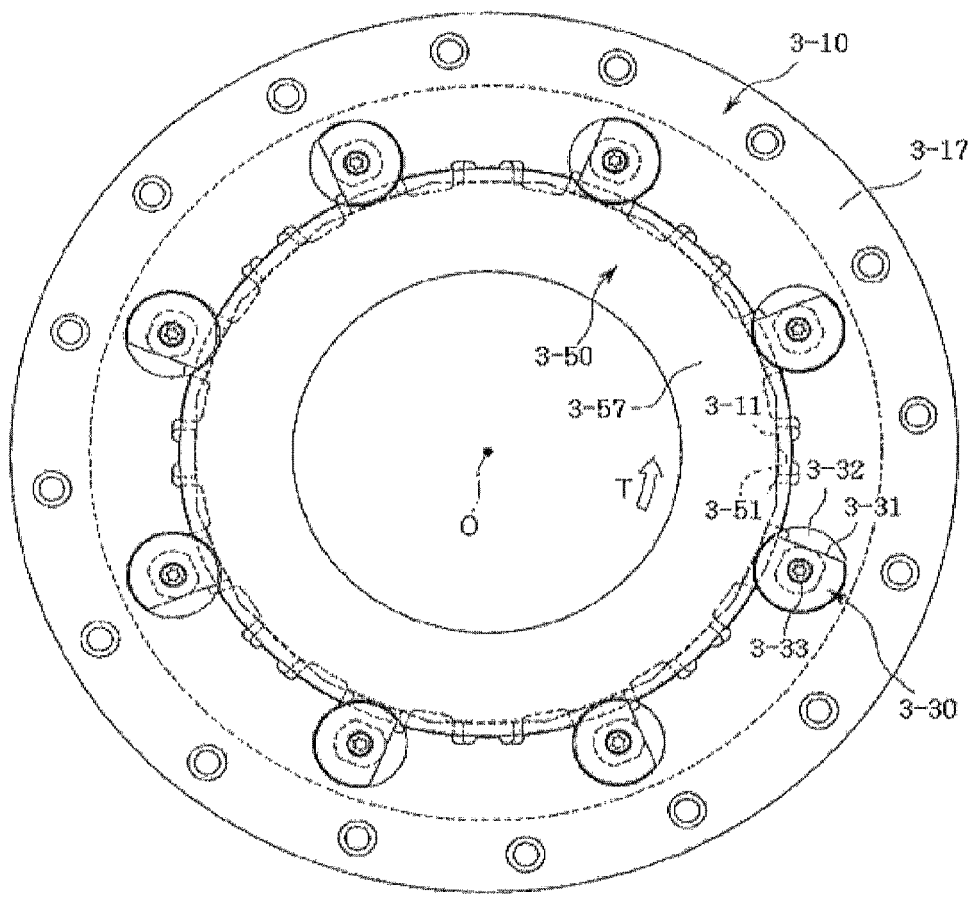
FIG. 11 is a plan view of a pin mirror cutter according to yet another embodiment of the present invention.
Figure 12:
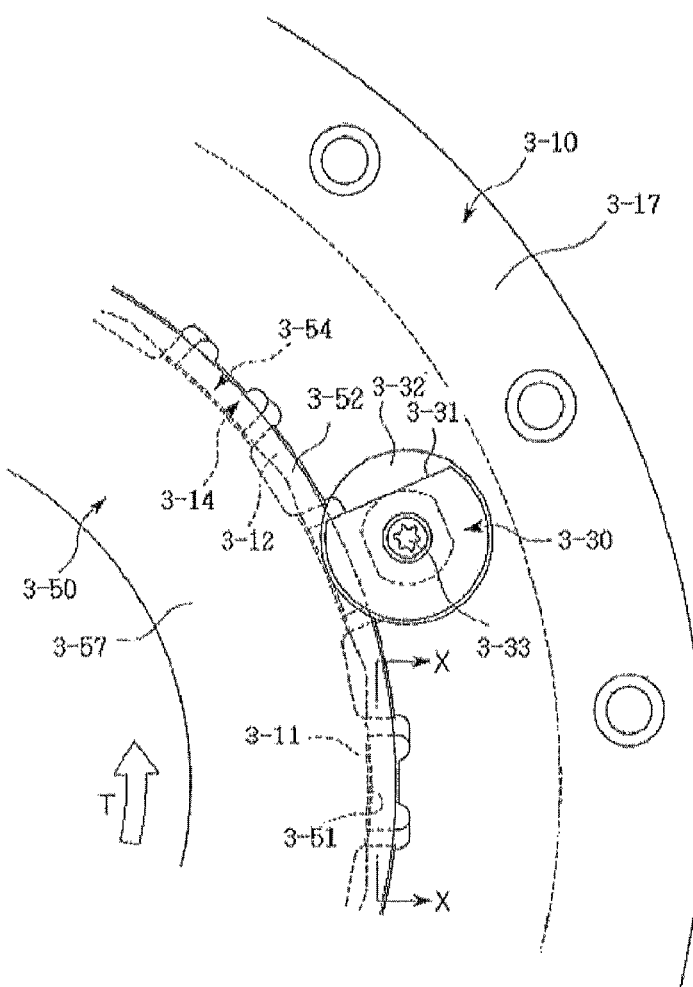
FIG. 12 is an enlarged view of principal parts of the pin mirror cutter shown in FIG. 11.

FIGS. 11 and 12 show a pin mirror cutter according to yet another embodiment of the present invention, which includes a substantially annular adaptor 3-10 mounted on a processing machine, and a substantially annular cutter body 3-50 about the axis O rotated around the axis O by being inserted into an inner peripheral part of this adaptor 3-10 and attached to the inner peripheral part of an adaptor 3-10.

In addition, although a plurality of throw-away tips which have cutting edges as pin edges for machining an outer peripheral face of a pin part (shaft part) in a crank shaft and cutting edges as wave edges for machining side faces of a counterweight part in the crank shaft are attached to the inner peripheral part of the cutter body 3-50, they are omitted in the drawing.

Figure 14:
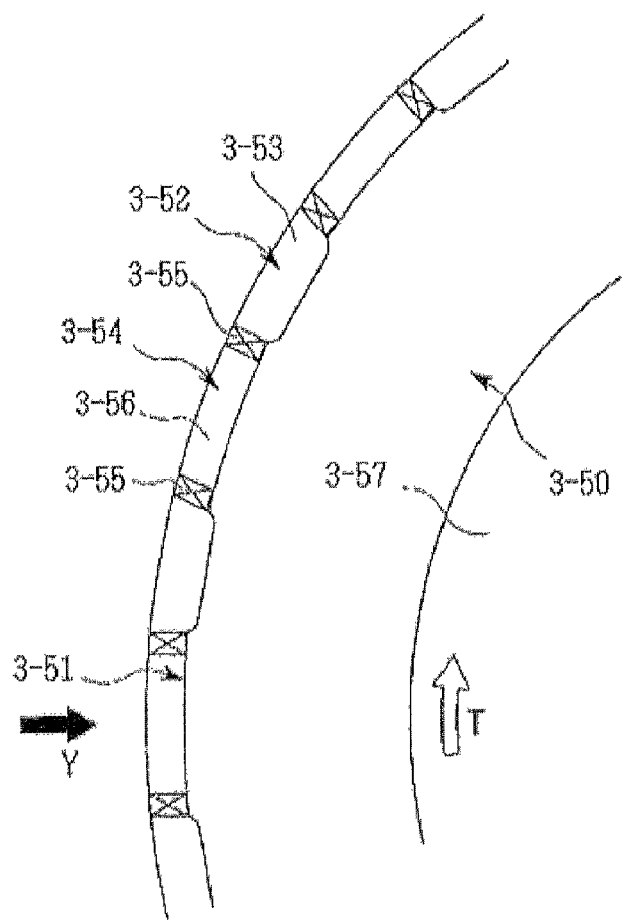
FIG. 14 is an enlarged view of the cutter body of the pin mirror cutter shown in FIG. 12 as seen from an end face on a rear side of the cutter body.
Figure 15:
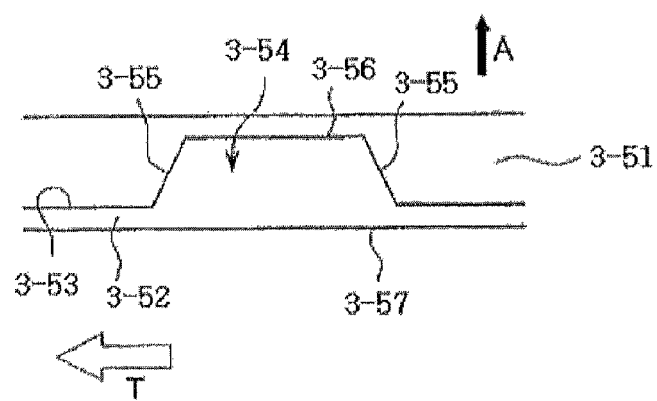
FIG. 15 is a sectional view as seen in the direction of the arrow Y of FIG. 14.

As shown in FIGS. 14 and 15, an entire peripheral part of an outer peripheral face 3-51 of the cutter body 3-50 in the rear region (the rear side in the direction when the cutter body 3-50 is inserted into the inner peripheral part of the adaptor 3-10 or the lower side in FIG. 15) in the cutter insertion direction A is caused to protrude toward the radial outer periphery of the cutter body 3-50.

Therefore, a substantially annular flange part 3-52 which protrudes toward the radial outer periphery from the entire periphery of that outer peripheral face 3-51 is formed in the cutter body 3-50, and this flange part 3-52 will have a substantially annular wall surface 3-53 which faces the front side (the upper side in FIG. 15) in the cutter insertion direction A.

Furthermore, as shown in FIGS. 14 and 15, the wall surface 3-53 (wall surface 3-53 which faces a stepped part 3-12 as will be described below) in the flange part 3-52 is formed with a plurality of salients 3-54 which protrude toward the front side in the direction of the axis O of the cutter body 3-50, i.e., in the cutter insertion direction A.

Thereby, the plurality of salients 3-54 (for example, four or more) of a substantially rectangular parallelepiped shape which protrude partially toward the front side in the cutter insertion direction A from the wall surface 3-53 are formed in the flange part 3-52 such that they are disposed substantially at equal intervals in the peripheral direction of the cutter body 3-50. Each of the plurality of salients 3-54, as shown in FIG. 15, has a pair of side faces 3-55, and 3-55 which faces the front side and rear side (peripheral direction) in the cutter rotation direction T.

Here, as shown in FIG. 15, the side face 3-55 the pair of side faces 3-55 and 3-55 in one salient 3-54, which is located on the front side in the cutter rotation direction T and faces the front side in the cutter rotation direction T, is inclined toward the rear side in the cutter rotation direction T as it goes to the front side in the cutter insertion direction A, while the side face 3-55 which is located on the rear side in the cutter rotation direction T and faces the rear side in the cutter rotation direction T, is inclined toward the front side in the cutter rotation direction T as it goes to the front side in the cutter insertion direction A.

That is, the pair of side faces 3-55 and 3-55 in the salient 3-54 are inclined such that the distance between becomes small gradually toward the protruding direction (front side in the cutter insertion direction A) of the salient 3-54.

Figure 16:
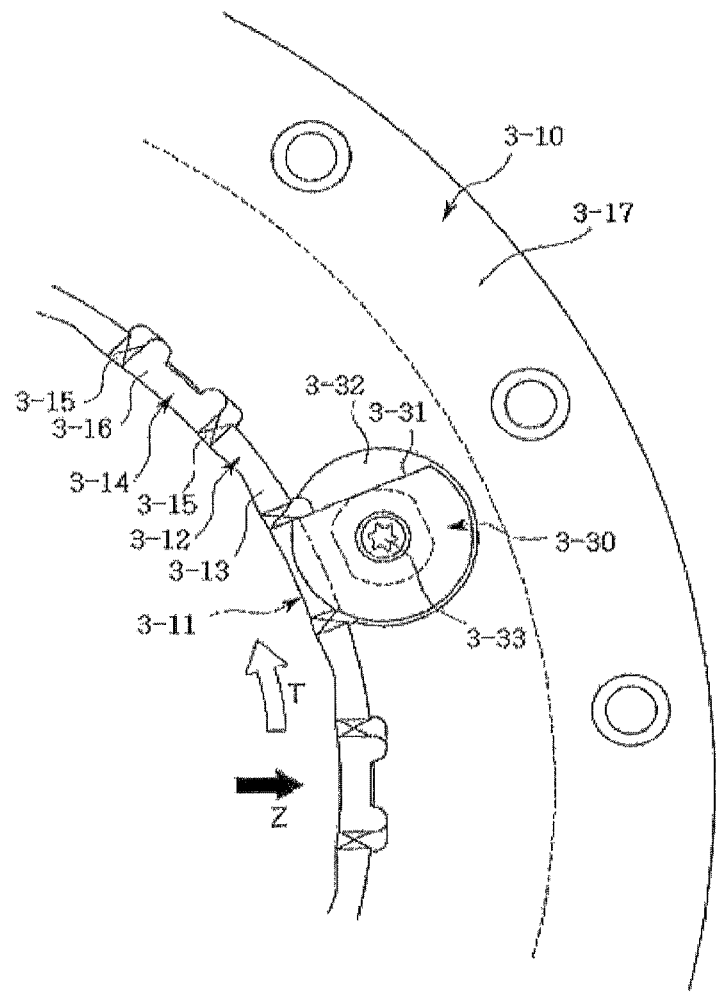
FIG. 16 is an enlarged view of the adaptor of the pin mirror cutter shown in FIG. 12 from an end face on a front side of the adaptor.
Figure 17:
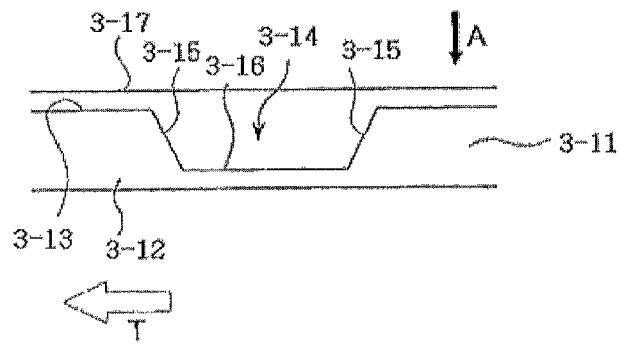
FIG. 17 is a sectional view as seen in the direction of the arrow Z of FIG. 16.

On the other hand, as shown in FIGS. 16 and 17, the entire peripheral part of the inner peripheral face 3-11 of the adaptor 3-10 in the rear region (the upper side in FIG. 17) in the cutter insertion direction A is recessed toward the radial outer periphery of the cutter body 3-50.

Therefore, the adaptor 3-10 is formed with a substantially annular stepped part 3-12 for receiving the flange part 3-52, which is recessed from the entire periphery of the inner peripheral face 3-11 toward the radial outer periphery, and is opened to the one end face 3-17 which faces the rear side in the cutter insertion direction A in an adaptor 3-10. This stepped part 3-12 is formed with a substantially annular constraint face 3-13 which faces the rear Furthermore, as shown in FIGS. 16 and 17, the wall surface 3-13 (wall surface 3-13 which faces the flange part 3-52 described above) in the stepped part 3-12 is formed with a plurality of recessed parts 3-14 which are recessed toward the front side in the direction of the axis O of the cutter body 3-50, i.e., in the cutter insertion direction A.

As a result, a plurality of recessed part 3-14 (for example, four or more) of a substantially rectangular parallelepiped shape which are partially recessed toward the front side in the cutter insertion direction A from the wall surface 3-13 and which allow the plurality of protruding parts 3-54 to fit thereinto are formed in the stepped part 3-12 such that they are disposed substantially at equal intervals in the peripheral direction of the adaptor 2-10. Each of the plurality of recessed part 3-14, as shown in FIG. 17, is formed with a pair of wall surfaces 3-15 and 3-15 which face the front side and rear side (peripheral direction) in the cutter rotation direction T.

Here, as shown in FIG. 15, the side face 3-15 of the pair of side faces 3-15 and 3-15 in one recessed part 3-14, which is located on the front side in the cutter rotation direction T and faces the rear side in the cutter rotation direction T, is inclined toward the rear side in the cutter rotation direction T as it goes to the front side in the cutter insertion direction A, while the wall surface 3-15 which is located on the rear side in the cutter rotation direction T and faces the front side in the cutter rotation direction T is inclined toward the front side in the cutter rotation direction T as it goes to the front side in the cutter insertion direction A.

That is, the pair of side faces 3-15 and 3-15 in the recessed part 3-14 is inclined such that the distance therebetween becomes small gradually toward the recessed direction (front side in the cutter insertion direction A) of the recessed part 3-14.

Figure 13:
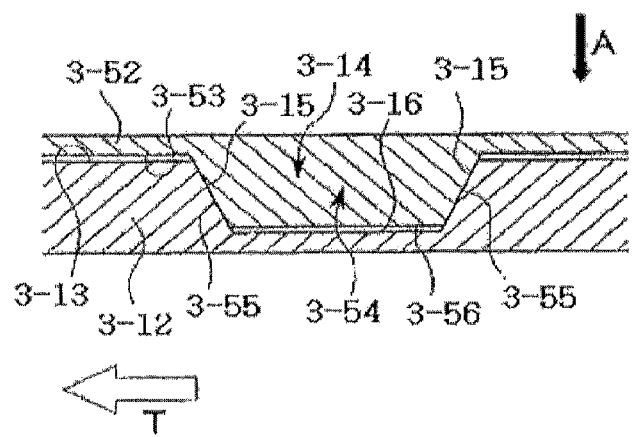
FIG. 13 is a sectional view taken along an X-X line of FIG. 12.

If the cutter body 3-50 is inserted into the inner peripheral part of the adaptor 3-10 along the direction of the axis O toward the front side in the cutter insertion direction A, the flange part 3-52 of the cutter body 3-50 is caught by the stepped part 3-12 of the adaptor 3-10, whereby as shown in FIGS. 12 and 13, the wall surface 3-53 of the flange part 3-52 is disposed to face the wall surface 3-13 of the stepped part 3-12, and the plurality of salients 3-54 formed in the flange part 3-52 are fitted into the plurality of recessed parts 3-14, respectively, formed in the stepped part 3-12.

When the plurality of salients 3-54 formed in the flange part 3-52 are fitted into a plurality of recessed parts 3-14, respectively, of the stepped part 3-12, a pair of wall surfaces 3-55 and 3-55 in each salient 3-54, are brought into surface contact with a pair of wall surfaces 3-15 and 3-15, respectively, in each recessed part 3-14.

In this way, when a pair of wall surfaces 3-55 and 3-55 of each salient 3-54 are brought into surface contact with a pair of wall surfaces 3-15 and 3-15, respectively, of each recessed part 3-14, the cutter body 3-50 is fixed to the adaptor 3-10 in the peripheral direction, and the axis O of the cutter body 3-50 is approximately aligned with the axis of the adaptor 3-10.

As described above, in the state where the cutter body 3-50 is inserted into the inner peripheral part of the adaptor 3-10 and the cutter body 3-50 is positioned in the direction of the axis O with respect to the adaptor 3-10, and the cutter body 3-50 is fixed to the adaptor 3-10 in the peripheral direction, and the axis O of the cutter body 3-50 is approximately aligned with the axis of the adaptor 3-10, the one end face 3-57 facing the rear side in the cutter insertion direction A in the cutter body 3-50 is pressed by a plurality of clampers 3-30 (for example, four or more), and thereby the cutter body 3-50 is firmly attached to the inner peripheral part of the adaptor 3-10.

In addition, in this embodiment of the present invention, with the cutter body 3-50 attached to the inner peripheral part of the adaptor 3-10, as shown in FIG. 13, a predetermined gap is formed between a top face 3-56 of the salient 3-54 formed in the flange part 3-52, and a bottom face 3-16 of the recessed part 3-14 formed in the stepped part 3-12, and a predetermined gap is also formed between the wall surface 3-53 of the flange part 3-52, and the wall surface 3-13 of the stepped part 3-12.

However, the top face 3-56 of the salient 3-54 formed in the flange part 3-52 and the bottom face 3-16 of the recessed part 3-14 formed in the stepped part 3-12 may be joined to each other, and the wall surface 3-53 of the flange part 3-52 and the wall surface 3-13 of the stepped part 3-12 may be joined to each other.

Each clamper 3-30 is formed substantially in the shape of a disc having a notched part 3-31 a portion of the outer peripheral part of which is cut away in a straight shape, and this clamper is fixed with a bolt 3-33 within a substantially circular spot-facing part 3-32 formed in the end face 3-17 of the adaptor 3-10 such that the portion also approaches the end face 3-57 of the cutter body 3-50, with the cutter body 3-50 inserted into the inner peripheral part of the adaptor 3-10.

The clamper 3-30 becomes freely rotatable about the bolt 3-33 within the spot-facing part 3-32 by loosening the bolt 3-33. Then, by rotating the clamper 3-30 so that the notched part 3-31 may be located on the radial inner peripheral side of the cutter body 3-50, the cutter body 3-50 can be inserted into the inner peripheral part of the adaptor 3-10, or the cutter body 3-50 can be removed from the inner peripheral part of the adaptor 3-10. On the contrary, by tightening the bolt 3-33 after the clamper 3-30 has been rotated so that the notched part 3-31 may not be located on the radial inner peripheral side of the cutter body 3-50, the cutter body 3-50 inserted into the inner peripheral part of the adaptor 3-10 can be firmly attached to the inner peripheral part of this adaptor 3-10.

As the pin mirror cutter constructed as above rotates around the axis O of the cutter body 3-50 and revolves around the axis of a crank shaft while it moves along the direction of the axis (the axis O of the cutter body 3-50) of the crank shaft, with the crank shaft bridged over a chuck being allowed to pass through an inner space of the cutter body 3-50, the crank shaft is machined into a certain shape by the pin mirror cutter.

According to the pin mirror cutter of the embodiment of the present invention as described above, with the cutter body 3-50 attached to the adaptor 3-10, the salient 3-54 formed in the flange part 3-52 is fitted into the recessed part 3-14 formed in the stepped part 3-12 such that the cutter body 3-50 is positioned in the direction of the axis O with respect to the adaptor 3-10 and the axis O of the cutter body 3-50 is approximately aligned with the axis of the adaptor 3-10.

Here, since the salient 3-54 is formed so as to protrude in the direction of the axis O from the wall surface 3-53 in the substantially annular flange part 3-52, and the recessed part 3-52 is formed so as to be recessed in the direction of the axis O of the cutter body from the wall surface 3-13 in the substantially annular stepped part 3-12, the gap located between the salients 54, and the recessed part 3-14 can be prevented from being opened toward both end faces of the cutter body 3-50 and toward both end faces of the adaptor 3-10. As a result, and the rigidity of each of the cutter body 3-50 and the adaptor 3-10 can be kept high.

That is, a substantially annular ribbed part (substantially annular flange part 3-52) remains in the outermost peripheral part of the cutter body 3-50, and a substantially annular ribbed part (part other than the substantially annular stepped part 3-12) remains in the innermost peripheral part of the adaptor 3-10. Thereby, each of the rigidity of the cutter body 3-50 and the adaptor 3-10 can be kept high.

Accordingly, since the mounting rigidity when the cutter body 3-50 is mounted to the adaptor 3-10 can be kept high, the deflection precision of a plurality of cutting edges provided in the inner peripheral part of this cutter body 3-50 can be kept well without causing any deviation of the cutter body 3-50 with respect to the adaptor 3-10, and consequently the machining accuracy of a crank shaft can be improved.

Moreover, since the salient 3-54 is formed such that the distance between the pair of side faces 3-55 and 3-55 is made small gradually toward the protruding direction of the salient 3-54, and the recessed part 3-14 is formed such that the distance between the pair of side faces 3-15 and 3-15 is made small gradually toward the recessed direction of the recessed part 3-14, the cutter body 3-50 can be easily inserted into the inner peripheral part of the adaptor 3-10, and the axis O of the cutter body 3-50 can be approximately aligned with the axis of the adaptor 3-10 certainly.

In addition, at least one side face 3-55 of the pair of side faces 3-55 and 3-55 in the salient 3-54 may extend along the cutter insertion direction A (the direction of the axis O of the cutter body 3-50 or the thickness direction of the cutter body 3-50), and at least one side face 3-15 of the pair of side faces 3-15 and 3-15 in the recessed part 3-14 may extend along the cutter insertion direction A (the direction of the axis O of the cutter body 3-50 or the thickness direction of the cutter body 3-50).

In the embodiment of the present invention described above, the wall surface 3-53 in the flange part 3-52 formed in the cutter body 3-50 is formed with the plurality of recessed parts 3-14 which are recessed toward the front side in the cutter insertion direction A, and the wall surface 3-13 in the stepped part 3-12 formed in the adaptor 3-10 is formed with the plurality of salients 3-54 which protrude toward the front side in the cutter insertion direction A. However, the present invention is not limited thereto. For example, the wall surface 3-53 in the flange part 3-52 may be formed with a plurality of recessed parts which are recessed toward the rear side in the cutter insertion direction A, and the wall surface 3-13 in the stepped part 3-12 may be formed with a plurality of salients which protrude toward the rear side in the cutter insertion direction A.

Moreover, although the embodiment of the present invention described above has been described in conjunction with a case in which the present invention is applied to a so-called internal pin mirror cutter in which a cutter body is attached to the inner peripheral part of an adaptor, the present invention is not limited thereto. For example, the present invention may be applied to a so-called external pin mirror cutter in which a cutter body is attached to the outer peripheral part of an adaptor.

Obviously, numerous modifications and variations of the present invention are possible in light of the above teachings. It is therefore to be understood that within the scope of the appended claims, the invention may be practiced otherwise than as specifically described herein.

The invention claimed is:

1. A pin mirror cutter comprising:
an adaptor mounted on a processing machine; and
a substantially annular cutter body which is attached to the adaptor and rotates around an axis,
wherein the cutter body is formed with a substantially annular flange part which protrudes in a radial direction of the cutter body from a substantially entire periphery of a peripheral face of the cutter body, and the adaptor is formed with a substantially annular stepped part which is recessed in the radial direction of the cutter body from a substantially entire periphery of a peripheral face of the adaptor and receives the flange part, and
wherein, with the cutter body attached to the adaptor, the flange part and the stepped part are brought into radially flat surface contact with each other such that they overlap each other in a flat plane in the radial direction of the cutter body, and a radial length of the cutter body in this contact surface is set to be in a range of 0.1 D to 1.0 D where D refers to a thickness of the cutter body.

2. The pin mirror cutter according to claim 1, wherein the cutter body is formed with a plurality of protruding parts which protrude in the radial direction of the cutter body from the peripheral face of the cutter body, and the adaptor is formed with a plurality of notched parts which are recessed in the radial direction of the cutter body from the peripheral face of the adaptor, wherein, with the cutter body attached to the adaptor, the plurality of protruding parts are fitted into the plurality of notched parts, respectively, whereby the cutter body is fixed to the adaptor in the peripheral direction, and the axis of the cutter body is approximately aligned with an axis of the adaptor.

* * * * *